United States Patent [19]
Hubeshi

[11] Patent Number: 5,947,544
[45] Date of Patent: Sep. 7, 1999

[54] ELECTROMECHANICAL SUN VISOR FOR MOTOR VEHICLE WINDOWS

[76] Inventor: Carmel Hubeshi, 3 Haegoz St., Hadera, Israel

[21] Appl. No.: 08/810,177

[22] Filed: Feb. 28, 1997

Related U.S. Application Data

[63] Continuation-in-part of application No. 08/551,273, Oct. 31, 1995.

[30] Foreign Application Priority Data

Sep. 22, 1995 [IL] Israel ......................................... 115402

[51] Int. Cl.⁶ ............................................................ B60J 3/02
[52] U.S. Cl. ........................ 296/97.4; 296/97.8; 160/23.1; 160/310; 160/312; 160/313
[58] Field of Search ................................ 296/97.4, 97.8; 160/231, 269, 310, 312, 313, 370.22

[56] References Cited

U.S. PATENT DOCUMENTS

| | | | |
|---|---|---|---|
| 2,874,770 | 2/1959 | Rohr et al. .......................... | 296/97.8 X |
| 4,758,041 | 7/1988 | Labeur ..................................... | 296/152 |
| 4,979,775 | 12/1990 | Klose ....................................... | 296/97.1 |
| 5,042,866 | 8/1991 | Cody ....................................... | 296/97.4 |
| 5,076,633 | 12/1991 | Hsu et al. ............................... | 296/97.4 |

FOREIGN PATENT DOCUMENTS

| | | | |
|---|---|---|---|
| 3413966 | 10/1985 | Germany ................................ | 296/97.4 |
| 61-41620 | 2/1986 | Japan ..................................... | 296/97.4 |
| 6-40253 | 2/1994 | Japan ..................................... | 296/97.4 |

*Primary Examiner*—Andrew C. Pike
*Attorney, Agent, or Firm*—Lowe Hauptman Gopstein Gilman & Berner

[57] ABSTRACT

An electromechanical sun visor for a motor vehicle window includes a sun shade screen rolled onto a spring-loaded takeup roller and a roller housing attachable to the interior of the roof of the vehicle adjacent the window upper side. A rotatable shaft is driven in forward and backward directions with a bidirectional electric motor connected to the car battery to retract and extend the sun shade screen. Extreme positions of the screen are detected with microswitches that control shut off of the motor.

16 Claims, 3 Drawing Sheets

ELECTROMECHANICAL SUN VISOR FOR MOTOR VEHICLE WINDOWS

RELATED APPLICATIONS

The present application is a continuation-in-part of application Ser. No. 08/551,273 filed Oct. 31, 1995, entitled "ELECTROMECHANICAL SUN VISOR FOR MOTOR VEHICLE WINDOWS".

TECHNICAL FIELD

The present invention relates to an electromechanical sun visor useful for motor vehicle windows and, more specifically, to a sun visor controlled by a remote control system such as an alarm system of the vehicle.

BACKGROUND OF THE INVENTION

Numerous shading systems for windows of motor vehicles are well known today such as curtains, venetian blinds, and folded cartons. Most of these window shading systems suffer from the need for manual intervention at the initiation and termination of each use. Some other systems, mechanically more complex, also suffer from similar disadvantages of inconvenience. Most similar to the present invention are manually actuated, spring-loaded roller collecting, sunshades.

The present invention eliminates the disadvantage of the need for manual intervention and lends itself to automatic and remotely actuated systems. Furthermore, the present invention benefits from convenient unobtrusive storage between usages.

The present invention relates to an electromechanical sun visor for a motor vehicle window. The visor comprises:

a sunshade screen rolled onto a spring-loaded takeup roller disposed within a housing. The roller housing is attached to the interior of the roof of the vehicle adjacent the upper side of a window. A bidirectional electric motor is connected to a power source. A rotatable shaft is driven forward and backward by the electric motor, and the shaft is mounted parallel to the roller.

At least one rubber-like pulley presses against the shaft. The sunshade screen passes between the shaft and the pulley in frictional retention.

Two microswitches are located at the opening of the roller housing where the sunshade screen passes, and each is connected to the electric motor for automatically stopping the feedout and the retraction of the sunshade screen.

The sun visor according to the present invention may be optionally connected to a remote controlled system of the vehicle such as the alarm system.

The present invention is not limited by the inconvenience of manual intervention and benefits from convenient storage. Additionally, the present invention lends itself to various automatic and remotely actuated methods of use.

The bidirectional electric motor has a 12-volt or 24-volt power source, which may be the vehicle battery or a separate battery. The electric motor may be connected to and may be controlled by the alarm system of the vehicle. The electric motor may also be controlled by an on/off switch or by remote control. In such cases, there may be a switch for disconnecting the electric motor from the alarm system and from the remote control.

The present invention is especially useful for the front window of vehicles wherein there are two parallel sun visors, one at each side of the front mirror and connected together by a flexible rotary cable.

The sunshade screen material may be any material normally used for curtains in vehicles such as cloth, plastic film, foil, or any combination thereof. The sunshade screen may have at least one thin flexible reinforcement strip. This thin flexible reinforcement strip may be aligned to traverse between the shaft and the pulley. In the preferred embodiment of the present invention the sunshade screen has three reinforcement strips, one alone each longitudinal edge (traversing between the shaft and a pulley) and one along the longitudinal center for reinforcement purposes exclusively.

In one preferred embodiment of the present invention the microswitches are electrooptic sensor switches. In this case, two black adhesive stickers are put on the sunshade screen and aligned in the path of the microswitches. The upper black sticker defines for the sensor the limit of the feedout while the lower black sticker defines the limit of the retraction.

In another preferred embodiment of the present invention, the microswitches are electromechanical sensor switches. In this case, two holes are made in the sunshade screen and aligned in the path of the microswitches. The upper hole defines for the sensor the limit of the feedout while the lower hole defines the limit of the retraction. (The holes may also be used in an electrooptic sensor.)

DETAILED DESCRIPTION OF THE INVENTION

Figure 1:
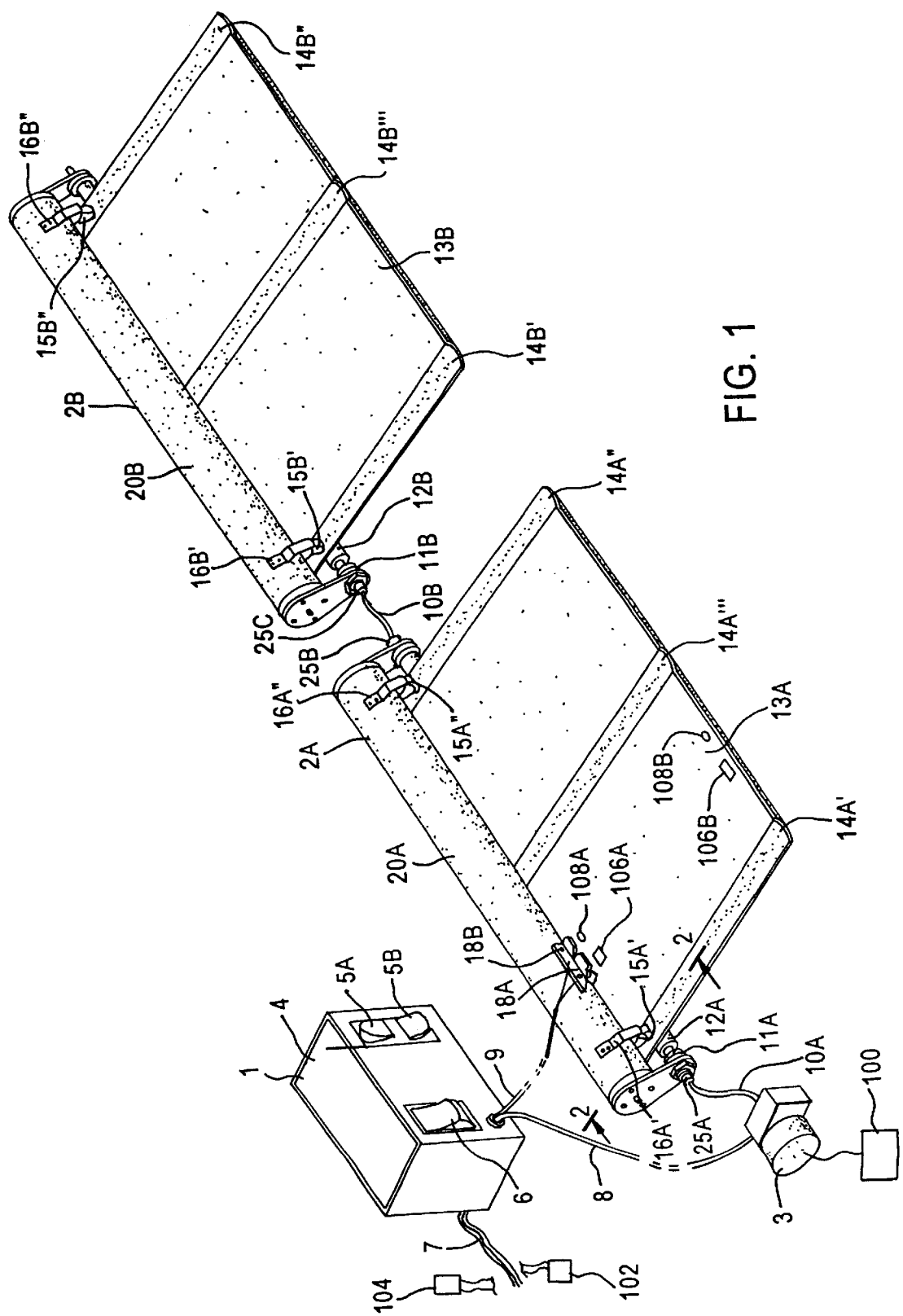
FIG. 1 is a perspective view of the electromechanical sun visor according to a preferred embodiment of the invention, preferred for installation to a front vehicle window.

Referring to FIG. 1, the electromechanical sun visor of the invention comprises a control box (1), two sun visor units (2A), (2B), and a bidirectional electric (12 V or 24 V) motor (3) connected to box (1) with cable (8) and linked together with their unique linkage and major components discussed hereinbelow. Motor (3) is powered by vehicle battery 100.

The control box (1) contains a control panel (4) having a sunshade screen up/down switch (5A), (5B), and a master on/off switch (6). The control box is connected by a wire (7) to a remote control unit (102) or to the alarm system (104) of the vehicle. When the control box master switch (6) is on and an up or down command is received either from the remote connection (7) or from the up/down switch (5A), (5B), then the appropriate polarity current is sent to the motor (3) to raise or lower the visors. This current is stopped when either the sensor (18A) detects that the sunshade screen is raised to the level of the sensor, or when the sensor (18B) detects that the sunshade screen is lowered to the level of closure, both levels being sensed by detection of a sticker (106A), (106B), or a hole (108A), (108B) (depicted in FIG. 1 only) on the screen. The sensors (18A), (18B) are connected to the control box (1) with wire (9).

Each of the preferably identical two sun visor units (2A), (2B) includes a concealment container (20A), (20B) for containment of the respective sunshade screen (13A), (13B) on a takeup roller having an electromechanical axle (11A), (11B), and a rotational energy linkage (10A), (10B), respectively.

The transfer of rotational energy occurs from the motor (3) through a flexible rotary cable (10A) which transmits rotative torque to an axle (11A) in the first sun visor unit through a rotary cable-to-axle attachment (25A). Torque is then transmitted from axle (11A) to a second axle (11B) in the second sun visor unit through a second rotational axle-to-cable attachment (25B), a second flexible rotary cable (10B), and a third rotational cable-to-axle attachment (25C), in that order.

Each axle (11A), (11B) is enclosed in a rubber-like tube (12A) (12B) which is part of the frictional mechanism used to pull the sunshade screen up or down. The other part of the frictional mechanism are four of rubber-like pulleys (15A'), (15A"), (15B'), (15B") which are respectively mounted to opposite ends of each container (20A), (20B) through a spring-loaded bracket (16A'), (16A"), (16B'), (16B"). Between these juxtaposed rotating frictional pairs (12A, 15A') and (12A, 15A") and (12B, 15B') and (12B, 15B") are the sunshade screens (13A) (13B). Each sunshade screen (13A), (13B) has flexible supporting strips. These supporting side strips run between the juxtaposed frictional members. There is also an additional supporting strip (14A'''), (14B''') along the middle of each sunshade screen. These supporting strips are similar to the flexible metal used, for example, in rolled metal measurement tapes that can be rolled up and, when rolled down, they keep the visor straight (at a required angle) without the need for tracks.

Figure 2:
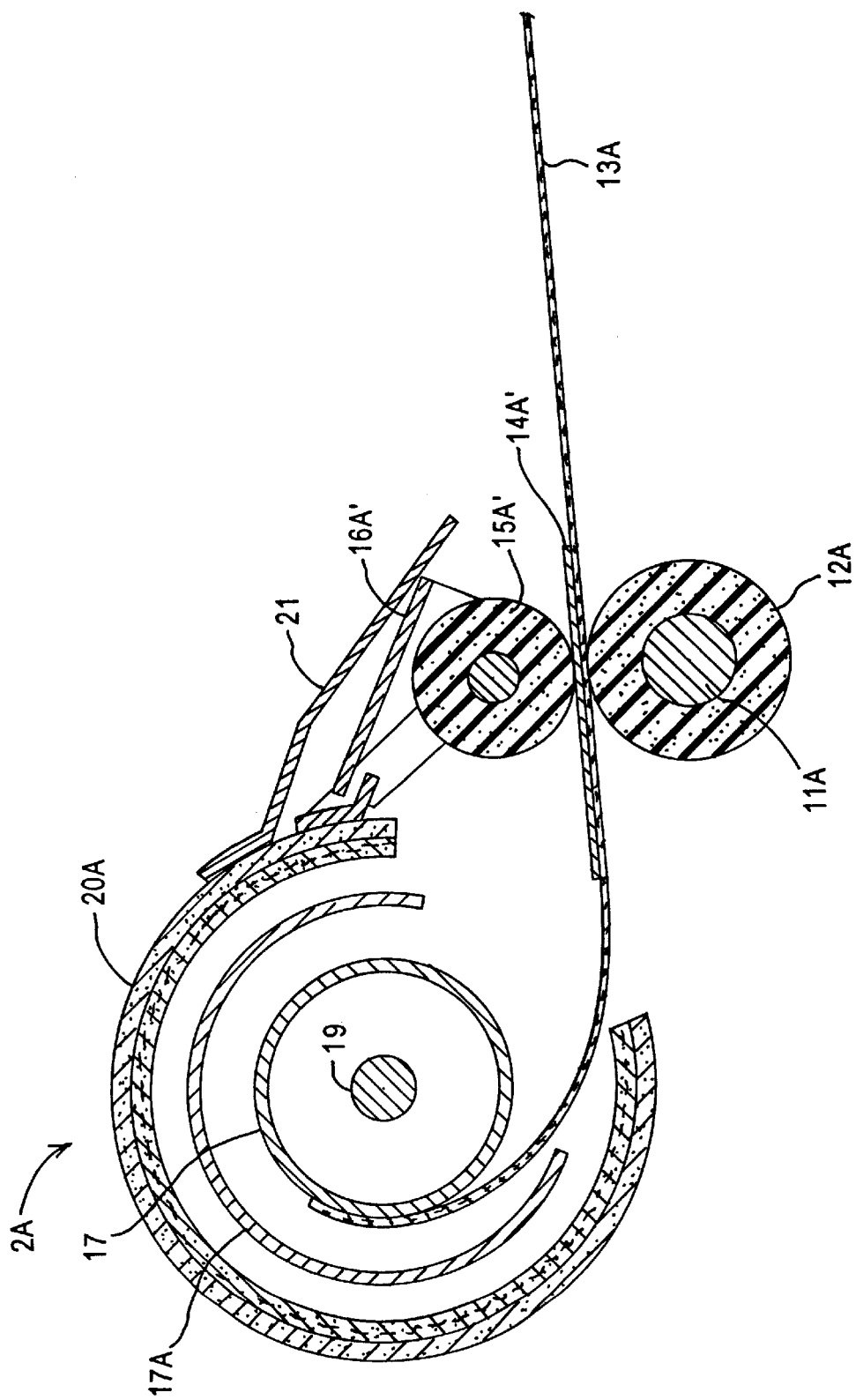
FIG. 2 is a sectional view taken along the line 2—2 of FIG. 1 to depict a cross section of the electromechanical sun visor unit.

FIG. 2 is an illustration of a cross section of electromechanical sun visor unit 2A with supporting strip (14A') only partially shows for ease of illustration. The sunshade screen (13A) has the flexible supporting strip (14A'), (14A''') which runs between the two juxtaposed rotating frictional members. One of the members is the axle (11A) with ends covered by rubber-like tubes. The other member is the rubber-like pulley (15A') pressed into place by spring-loaded bracket (16A'). The sunshade screen is rolled onto a takeup roller (17) which encloses a spring-loaded axle (19). The sunshade screen is held to the takeup roller (17) by a longitudinally split cylindrical clip (17A). This takeup roller is housed in concealment container (20A) which has a protective door (21) to protect the rotating components from contact with stray objects.

Figure 3:
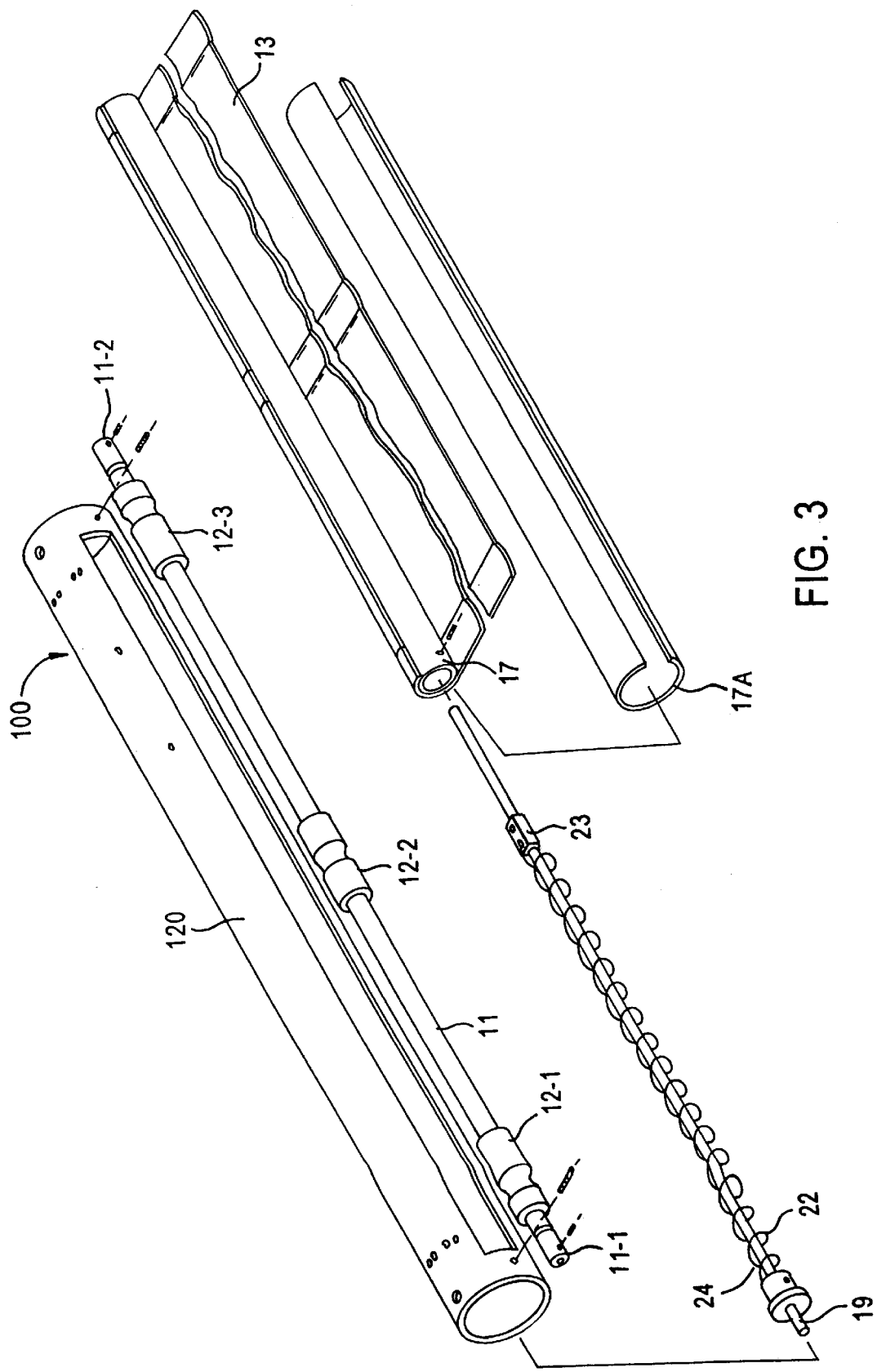
FIG. 3 is an exploded cross section of an electromechanical sun visor unit.

FIG. 3 is an illustration of an exploded cross section of an electromechanical sun visor unit 100. Sun visor unit 100 is the same as sun visor unit 2A, with the exception that sun visor 100 includes an alternative arrangement of the axle (11A) and rubber-like tube (12A) of sun visor unit 2A depicted in FIGS. 1 and 2. Sun visor unit 100 includes concealment container 120. Four levels of enclosure are exposed wherein the spring-loading takeup assist mechanism (24) is inserted into the takeup roller with its surrounding clip, which is in turn located within the concealment container (120).

The spring-loading takeup assist mechanism (24) is comprised of a spring-loaded axle to which is affixed one end of coaxial spiral spring (22). The other end of spring (22) is partially stretched and also wound around the axle; this other end of the spiral spring is affixed to a block (23), thus loading the mechanism (24) with initial rotational potential.

This potential assists the sun visor screen takeup mechanism in two ways. First, when the sun visor screen is drawn from the takeup roller by the powered frictional rollers, the return potential is stored in the spring. Second, the initial loading of the spring provides a return potential for the last section of the sun visor screen to be returned. The spring-loading takeup assist mechanism is inserted into the takeup roller.

Onto the takeup roller is partially wound the sun shade screen (13A) which is in turn held in place by the longitudinally split cylindrical clip (17A). This entire assembly (19), (17), (13A), (17A) is in turn located within the concealment container (20A).

In FIG. 3, alongside of and attached to the concealment container is the powered axle (11). In this alternative arrangement of the axle, the rubber-like tube (12A) of FIG. 2 has been replaced with three sections of rubber-like tubing (12-1), (12-2), (12-3).

Note that since the two sun visor units are identical (except for the placement of the sensors), the motor may be attached either from the left side of the two joined units or from the right side of the two joined units. Also, a suitably sized single unit may be used with a separate motor to cover the rear window.

The reinforcement strips (14A'), (14A"), (14A'''), (14B'), (14B"), and (14B''') may be similar to metal measurement tapes, as explained above, to impart planar rigidity to the unrolled length of the sun screen to advantageously enable the sun screen to cover and uncover a window without the need for slide tracks engaging outermost edges of each screen. This unique type of use of metal tape or slat advantageously also enables the screen to be easily wound onto the takeup roller during retraction. Preferably, the concave side of each support slat-like member is adopted to face towards the front or rear window (depending on where the invention is being used) so that the unrolled length of screen remains in covering position against the window and does not droop.

When the invention is connected to the autoalarm system, the controller can be configured so that the screens are automatically unwound into covering position when the car alarm is actuated. This advantageously reduces the likelihood of theft since a would-be car thief must overcome the alarm system as well as the visual impairment caused by the screen covering the car windows.

In FIG. 3, the rubber-like tubing members (12-1), (12-2), and (12-3) are preferably used when the sun visor unit extends the full length of the window/(i.e., preferably the rear window). Although not shown in detail, opposite ends (11-1) and (11-2) of axle (11) may be journaled in mounts attached to the roof interior adjacent the upper end of the rear window. Alternatively, opposite axial ends (11-1), (11-2) may be mounted through brackets to corresponding opposite ends of concealment housing (120) (not shown in detail but obvious to one of ordinary skill from review of the specification).

I claim:

1. An electromechanical sun visor for a motor vehicle window comprising:

(a) a sun shade screen rolled onto a spring-loaded takeup roller, and a roller housing containing said screen and having an opening for passing said screen there through, wherein said roller's housing is attachable to an interior of a roof of a vehicle adjacent an upper side of the window;

(b) a bidirectional electric motor connected to a power source;

(c) a rotatable shaft driven forward and backward by the electric motor, wherein said shaft is mounted parallel to the roller;

(d) at least one rubber-like pulley pressing against the shaft, wherein the sun shade screen passes between the shaft and the pulley; and (e) two microswitches located at the opening of the roller housing where the sun shade screen passes, wherein each is connected to the electric motor for automatically stopping feedout and retraction of the sun shade screen.

2. An electromechanical sun visor according to claim 1, wherein the bidirectional electric motor has a 12-volt or 24-volt power source.

3. An electromechanical sun visor according to claim 2, wherein the power source is the vehicle's battery.

4. An electromechanical sun visor according to claim 1, wherein the sun shade screen's material is selected from cloth, plastic film, foil, or any combination thereof.

5. An electromechanical sun visor according to claim 1, wherein the electric motor is connected to an alarm system of the vehicle.

6. An electromechanical sun visor according to claim 5, wherein the electric motor is controlled by an alarm remote control of the vehicle.

7. An electromechanical sun visor according to claim 6, further comprising a switch for disconnecting the electric motor from the alarm system and from the remote control.

8. An electromechanical sun visor according to claim 1, wherein the electric motor is controlled by an on/off switch or by remote control.

9. An electromechanical sun visor according to claim 1, including two of said sun visors connected together by a flexible rotary cable.

10. An electromechanical sun visor according to claim 1, wherein the microswitches are electrooptic sensor switches.

11. An electromechanical sun visor according to claim 10, further comprising a black adhesive sticker on the sun shade screen and aligned in a path of one of the microswitches so as to define to the sensor switches a limit of the feedout or the retraction.

12. An electromechanical sun visor according to claim 10, further comprising a hole in the sun shade screen and aligned in a path of one of the microswitches so as to define to the sensor switches a limit of the feedout or the retraction.

13. An electromechanical sun visor according to claim 1, wherein the microswitches are electromechanical sensor switches.

14. An electromechanical sun visor according to claim 13, further comprising a hole formed in the sun shade screen and aligned in a path of one of the microswitches so as to define to the sensor switches a limit of the feedout or the retraction.

15. An electromechanical sun visor according to claim 1, wherein the sun shade screen has at least one thin flexible reinforcement strip.

16. An electromechanical sun visor according to claim 15, wherein the thin flexible reinforcement strip is aligned to traverse between the shaft and the pulley.

* * * * *